March 7, 1944. C. A. KOTTERMAN 2,343,379
WATERPROOF RECTIFIER
Filed April 3, 1942
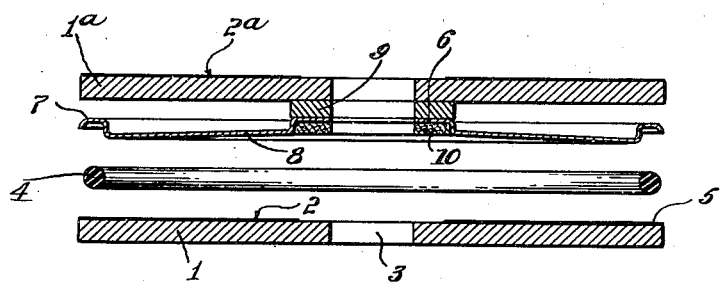
INVENTOR
C. A. Kotterman
BY
ATTORNEY Patented Mar. 7, 1944

2,343,379

UNITED STATES PATENT OFFICE 2,343,379

WATERPROOF RECTIFIER

Chester A. Kotterman, Livingston, N. J., assignor to Federal Telephone and Radio Corporation, a corporation of Delaware Application April 3, 1942, Serial No. 437,517

6 Claims. (Cl. 175—366)

This invention relates to new and useful improvements in rectifiers and more particularly to selenium rectifiers suitable for assembly into a stack.

The objects of the invention are of such construction and arrangement of the elements of a rectifier that they can be easily assembled into a water-tight rectifier or a stack of water-tight rectifiers.

The drawing represents, in cross-section, a portion of a rectifier stack in a partially assembled condition.

1 is a metal plate or back electrode on which is deposited a layer of selenium 2 which is coated on its exposed surface with one or more metals or an alloy, forming a counter-electrode. The metal layer does not extend quite to the periphery of the disc or plate. The selenium clears a central perforation 3 in the plate 1. A ring or gasket 4 of rubber or other resilient insulating material having a cross-section which may be circular, as shown, or if desired, some other shape such as rectangular or square, is placed along the outer edge 5 of the back electrode 1. On top of the back electrode is placed a flexible metal disc 6. The disc has a rim 7 whose cross-section is such as to seat itself on the ridge formed by the insulating ring 4. From the rim 7 towards its center the body of disc 6 is cupped as indicated at 8 to form a cavity into which fits a spacer washer 10. The thickness of this washer determines the amount of surface of the metal layer contacted by the member 7 and the amount of pressure it exerts on the metal layer. The disc is made of spring brass or other flexible conducting material. It is normally out of contact with the selenium, but when it is pressed down towards the selenium 2 it will be flattened out so that the portion 8 will make good contact with the alloy sprayed on the selenium throughout its surface. The brass disc 8 will thus serve as a contact to the sprayed surface.

If it is desired to build up a stack of cells, then on top of the flat central portion of the disc 6 a metal washer 9 is placed. On top of the washer is assembled a second cell as indicated at 1a and 2a and thus the construction continued until a stack containing the required number of units is completed.

The elements of a single cell or the whole stack can be clamped together by means of a rod passing through the central perforations of the elements. The resilient rings 4 will form a water-tight seal for each element.

What I claim is:

1. In a rectifier, a metal plate, a layer of selenium on said plate, a counter-electrode on the surface of the selenium, a ridge of insulating material enclosing an area of the counter-electrode covered selenium, and a contacting member of resilient material seated on and making a tight fit with said ridge normally out of contact with the surface of the enclosed area but movable into contact therewith substantially throughout its surface.

2. In a rectifier, a metal plate, a layer of selenium thereon, a conducting coating on the exposed surface of said selenium, a ring of insulating material on said plate enclosing an area of the coated selenium, and a flexible contacting member seated on and making a tight fit with said ring normally out of contact with the surface of the enclosed area but when pressed at its center contacting therewith substantially throughout its surface.

3. In a rectifier, a metal plate, a layer of selenium thereon, a conducting coating on the exposed surface of said selenium, a ring of resilient insulating material on said plate enclosing an area of the coated selenium, a flexible contacting member seated on and making a tight fit with said ring normally out of contact with the enclosed area of the coated selenium but when pressed at its center contacting therewith substantially throughout its surface, a conducting washer on top of said contacting member, and a metal plate of a second rectifier on top of said washer.

4. In a rectifier, a back electrode, a layer of selenium covering one surface of the electrode, an alloy coating covering the exposed surface of said selenium except near the periphery of the selenium, a resilient gasket coextensive with and resting on the uncoated peripheral selenium surface enclosing the area within it, a spring metallic contacting member having a rim making a water-tight fit over the gasket and a cupped body normally out of contact with the coated selenium but when pressed at its center contacting therewith substantially throughout its surface, a washer on top of said contacting member, and a back electrode of a second rectifier on top of said washer.

5. A water-tight rectifier arrangement comprising a metal plate, a layer of selenium on the plate, a conductive coating on the exposed surface of the selenium, a ring of insulating material over the plate enclosing an area of the coated selenium, a flexible contacting member having a rim fitted on and making a water-tight fit with said ring and an imperforate surface within said rim, and a pressure washer between an inner portion of said plate and the inner portion of said contacting member, the arrangement being such that when the contacting member is pressed against the washer the surface of the contacting member between its inner portion and the rim is pressed into contact with the coated selenium.

6. A water-tight rectifier arrangement comprising a back electrode plate, a layer of selenium covering one surface of the plate, a metallic coating covering the exposed surface of the selenium except around the periphery of the selenium, a resilient ring coextensive with and resting on the uncoated peripheral selenium surface enclosing the area within it, a metallic spring contacting member having a rim making a continuous water-tight fit over the ring and a cupped imperforated body which when pressed at its center makes contact with the coated selenium surface, and a washer between the plate and the inner portion of the contacting member against which the contacting member is pressed.

CHESTER A. KOTTERMAN.